UNITED STATES PATENT OFFICE.

CHARLES B. HEADLY, OF PHILADELPHIA, PENNSYLVANIA.

COMPOUND METAL BAR OR PLATE.

SPECIFICATION forming part of Letters Patent No. 344,831, dated July 6, 1886.

Application filed March 12, 1884. Serial No. 123,947. (Specimens.)

*To all whom it may concern:*

Be it known that I, CHARLES B. HEADLY, of the city and county of Philadelphia, and State of Pennsylvania, have invented a new Article of Manufacture, of which the following is a specification.

The object of my invention is to produce a new article of manufacture consisting of an alloy of copper and tin in the proportions necessary to give the color, elasticity, and non-oxidizable quality of such fourteen-carat gold as is made from substantially two hundred and twenty pennyweights of United States gold coin, sixty-five pennyweights of pure silver, and sixty-seven pennyweights of pure copper, said alloy being provided with an outer surface or coating of gold, with the result that articles of various kinds may be manufactured therefrom, so as to present on their outer or wearing surfaces a surface or coating of gold, the inner substance of said article being composed of the alloy specified. The alloy employed by me for making said article of manufacture is composed of substantially one hundred parts of copper and twelve parts of tin, and is made by melting the same together, or by melting them separately and afterward mixing them together. This alloy possesses the color, the elasticity, and the non-oxidizable characteristic of gold of about fourteen carats fineness. The application of gold to the outer surfaces of this alloy may be accomplished by electro-deposition, or, preferably, by the ordinary process of applying sheets of gold to sheets of base metal by soldering and rolling, then bending said sheet or strip of gold-surfaced alloy into the form of a cylinder or tube, soldering the edges together, and drawing said gold-surfaced tube through dies to produce a gold-surfaced rod or wire of the desired size. I do not, however, limit myself to any specific means of providing said alloy with a surface of gold, as any suitable method may be employed for the purpose without changing the nature of my invention.

I am aware that gold-surfaced alloys have heretofore been made; but in all such cases they have been open to one or more of the following objections, viz: that the alloy was not the same in color as gold, or that it did not possess its non-oxidizable characteristic, and therefore became plainly visible and easily tarnished in case of the wearing off of the outer surface of gold, or to the objection that said alloy did not possess the degree of elasticity of gold, with the result that the article manufactured therefrom was not elastic in the degree desired.

My article of manufacture possesses the following advantages, viz: that the elasticity of articles manufactured therefrom is as great as though fourteen-carat gold such as I have above described had been used, as the elasticity of the alloy employed is the same as that of gold itself, and in the case of the wearing off of the outer surface of gold a non-oxidizable surface of the same color as gold is presented.

My new article of manufacture is, as will be well understood, suitable for many purposes for which fourteen-carat gold such as I have above described is employed, and it is especially suitable for the manufacture of spectacle and eyeglass frames, in which the desirable characteristics above enumerated are required.

Having thus described my invention, I claim—

As a new article of manufacture, an alloy composed of one hundred parts of copper and twelve parts of tin, said alloy being provided with an outer surface of gold.

In testimony whereof I have hereunto signed my name this 10th day of March, 1884.

CHAS. B. HEADLY.

Witnesses:
JOHN JOLLEY, Sr.,
W. C. STRAWBRIDGE.